(No Model.) 4 Sheets—Sheet 1.
G. W. PRICE.
MACHINE FOR MAKING NETS.
No. 491,592. Patented Feb. 14, 1893.
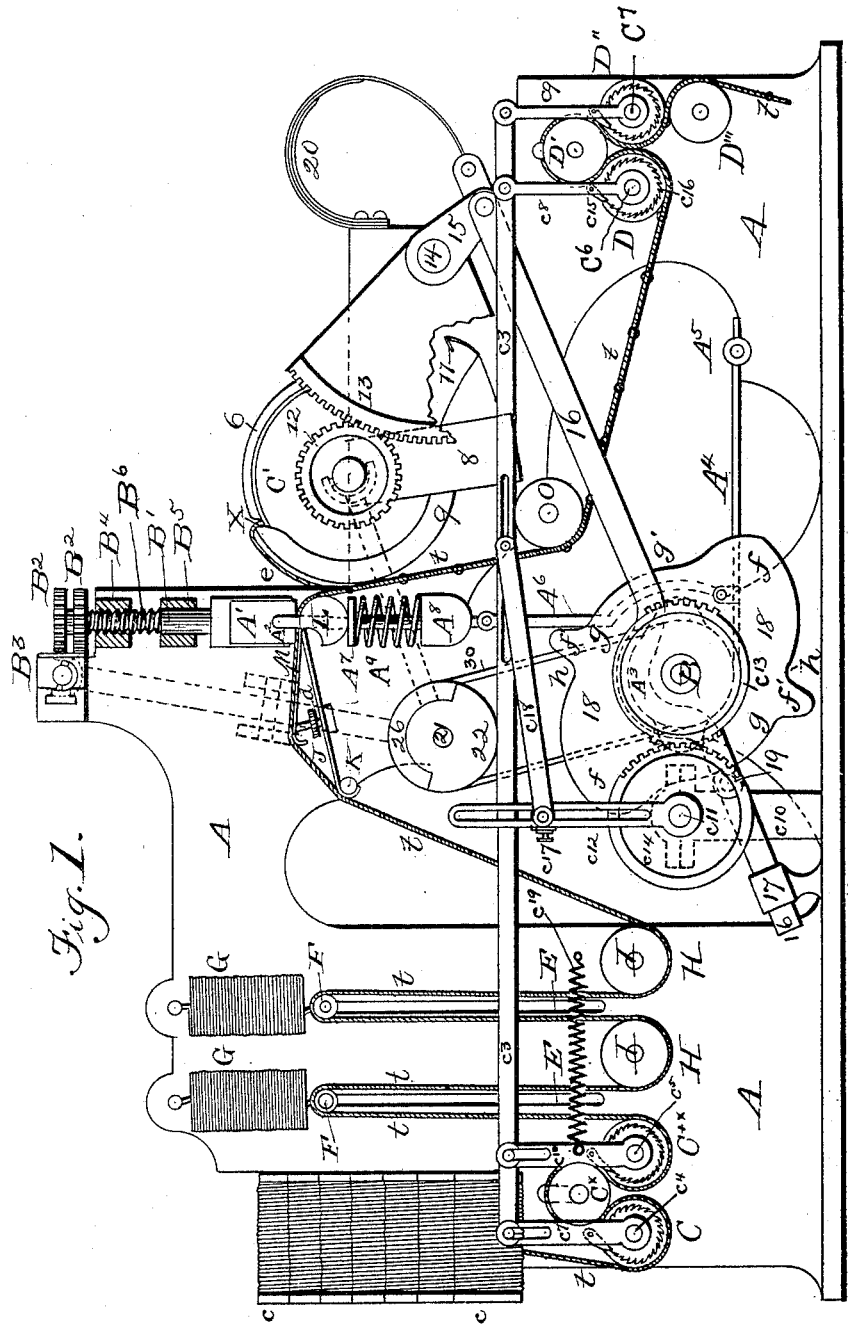
Witnesses
Thos. P. Robertson
W. E. McDaniel
Inventor
George W. Price
By Price & Stewart
Attorneys

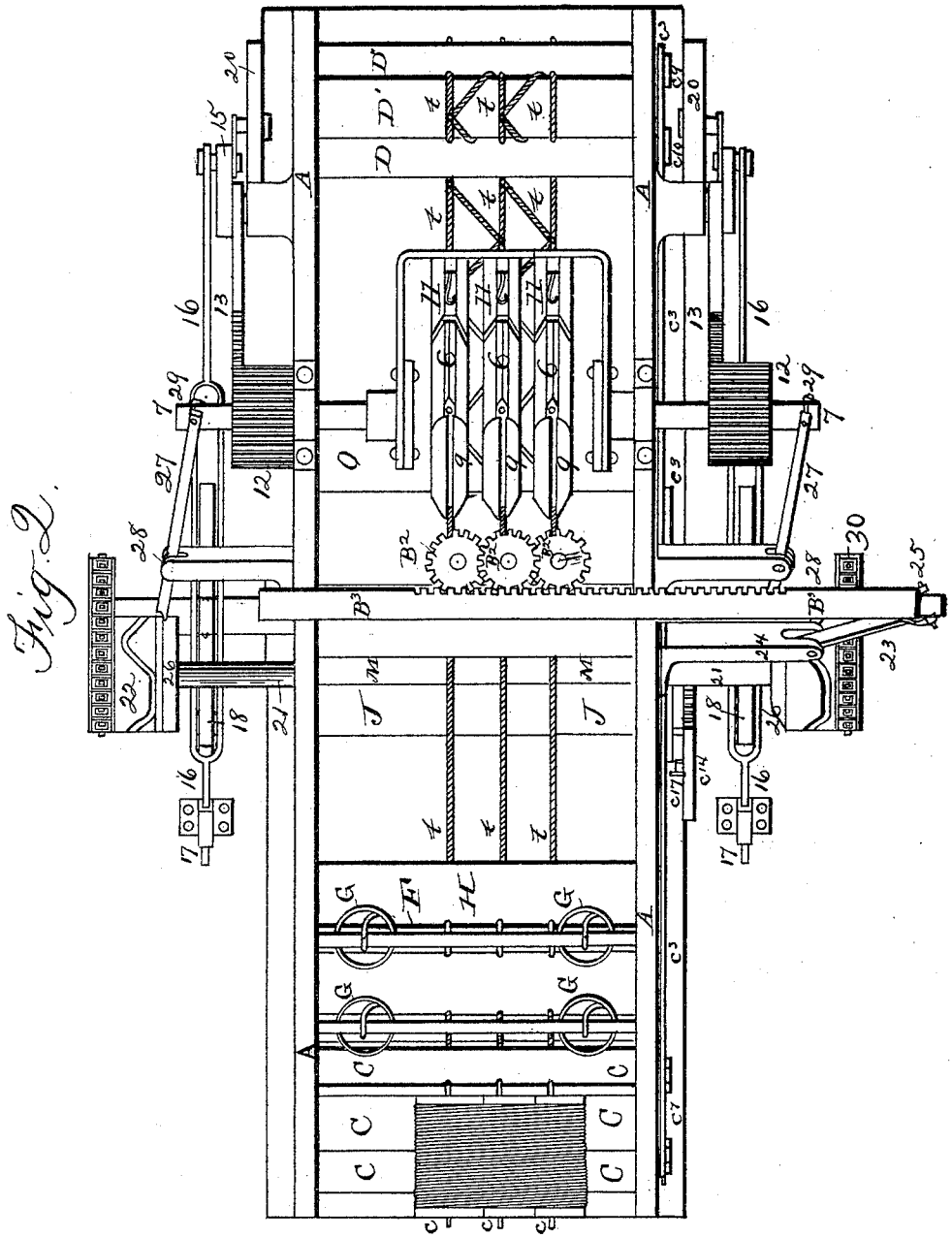

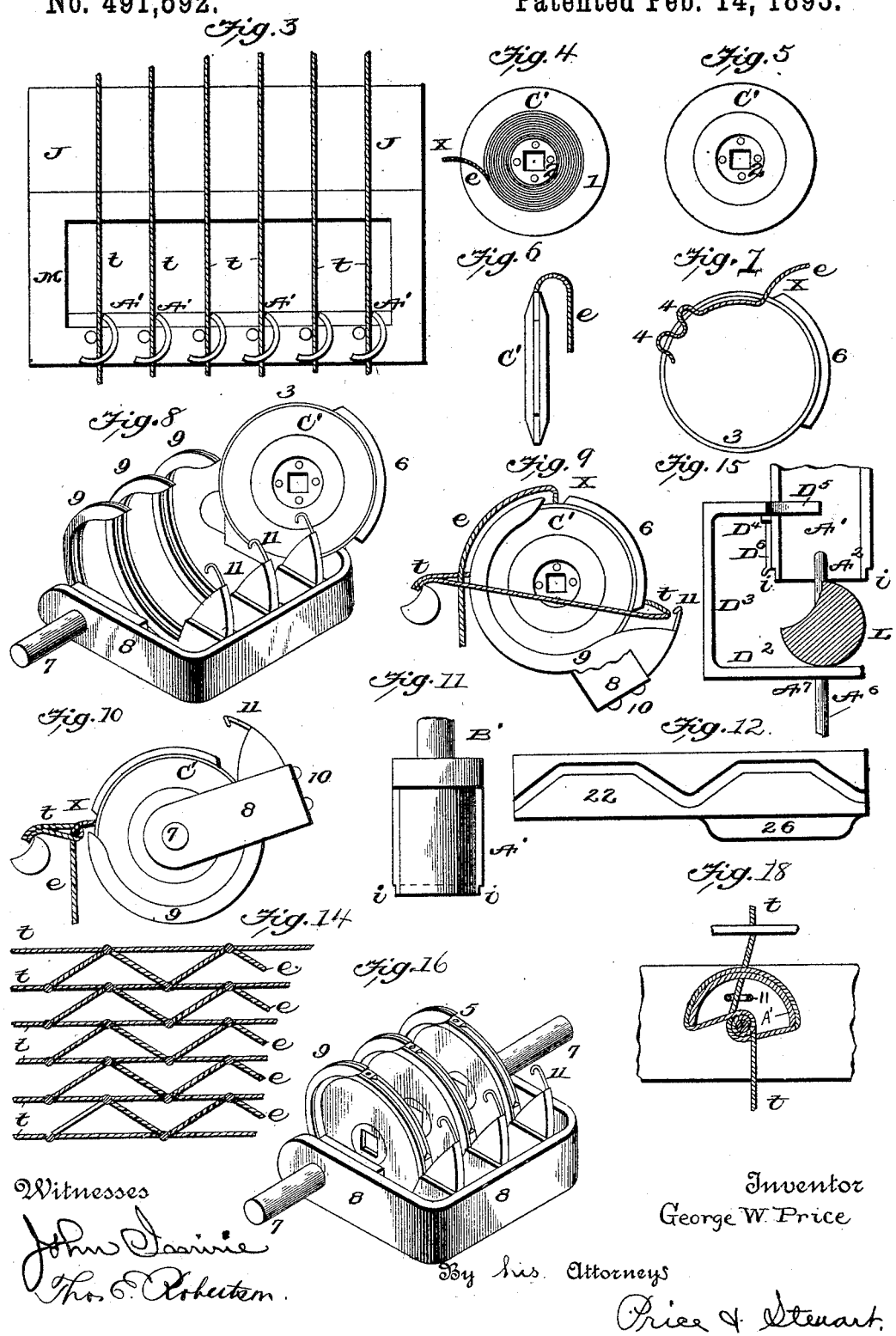

(No Model.) 4 Sheets—Sheet 4.

G. W. PRICE.
MACHINE FOR MAKING NETS.

No. 491,592. Patented Feb. 14, 1893.

Witnesses
Thos. E. Roberton
W. E. Clendaniel

Inventor
George W. Price,
By Price & Stewart
Attorneys

UNITED STATES PATENT OFFICE.

GEORGE W. PRICE, OF BALTIMORE, MARYLAND, ASSIGNOR TO WILLIAM J. HOOPER, OF SAME PLACE.

MACHINE FOR MAKING NETS.

SPECIFICATION forming part of Letters Patent No. 491,592, dated February 14, 1893.

Application filed December 31, 1891. Serial No. 416,737. (No model.)

*To all whom it may concern:*

Be it known that I, GEORGE W. PRICE, a citizen of the United States, and a resident of Baltimore city and State of Maryland, have invented certain new and useful Improvements in Machines for Making Nets, of which the following is a specification.

My invention relates to machines for making seines, nets, &c., such as are used particularly as gill nets, and are made of fine thread, and has for its object to simplify the construction of machines of this character and to increase their capacity.

Figure 13:
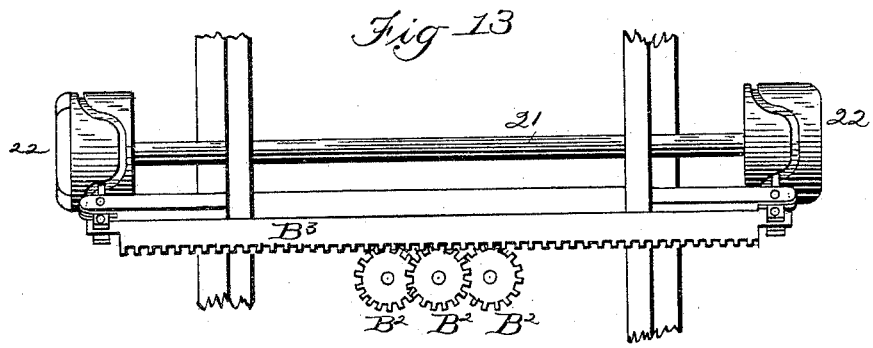
Figure 17:
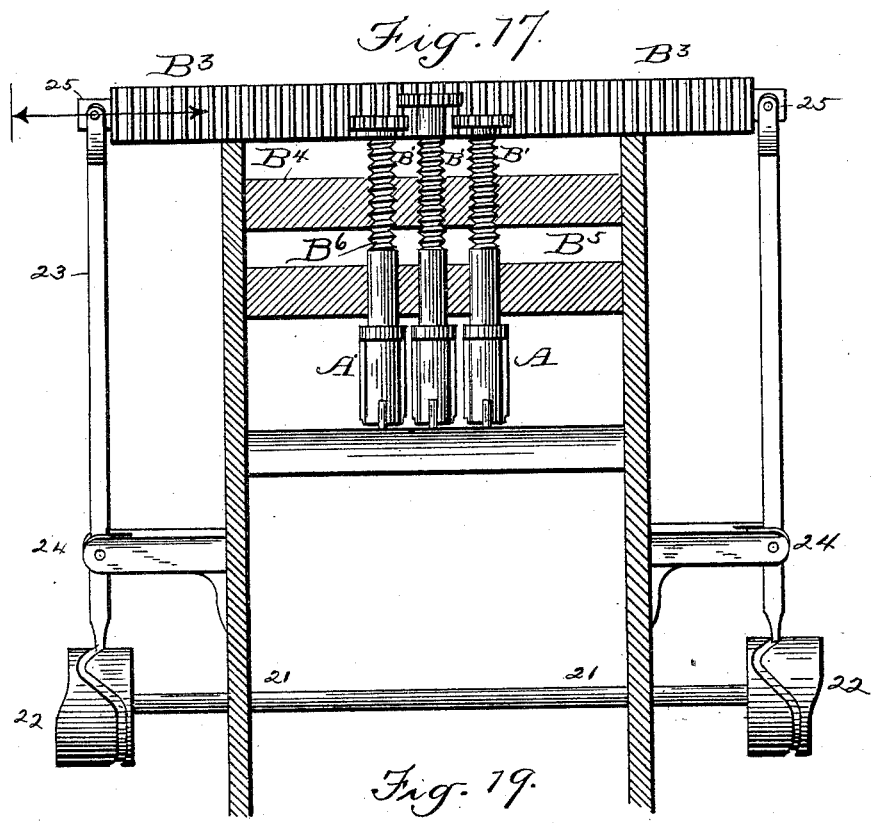
Figure 19:
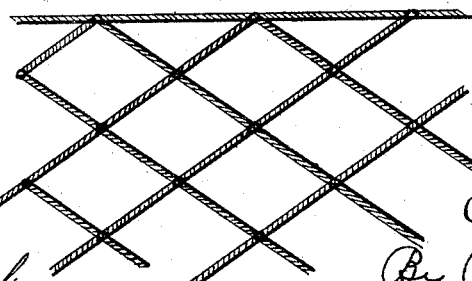

In the drawings Figure 1, is an upright side view of the machine, part in section and part broken away, and having the front supporting frame removed. Fig. 2, is a top or plan view of the same. Fig. 3, is a top view of the plate over which the twines pass, showing also the semi-cylinders and the relation of the twines thereto. Figs. 4, 5 and 6, are views of the bobbin. Fig. 7, is a view of the ring 3, provided with the spreader, and showing the course of the twine $e$ through the perforations 4, 4, and its final outlet. Fig. 8, is a view of the frame carrying the bobbin-holders with a bobbin ready to be placed in a holder. Fig. 9, is a view of one of the bobbins and the loop which has been pulled over it by the hook. Fig. 10, shows the position of a bobbin and holder as the loop has left them catching the twine $e$. Fig. 11, a view of the loop forming cylinder. Fig. 12, is a view of the circumference of the cam for giving motion to the rack, laid out flat. Fig. 13, is a top view of the rack and cog-wheels for turning the cylinders, and parts immediately connected therewith. Fig. 14, a view of the meshes of the net when formed. Fig. 15, is a view of the devices for throwing the loop from the cylinder. Fig. 16, is a perspective view of the frame carrying the bobbins and bobbin-holders. Fig. 17, is a sectional front view of the machine. Fig. 18, is a sectional view of one of the cylinders showing a loop as formed around it and its corresponding pin, and also the hook in position to catch the twine. Fig. 19, is a view of the seine or net as it leaves the machine.

A represents the frame of the machine which supports its shafts and working parts.

B is the main shaft which actuates the devices.

C, $C^x$, $C^{xx}$, are rollers around which the twine passes from a series of bobbins or spools $c$.

$C'$ are bobbins of which there may be any number, on which other twines are wound.

D, $D'$, $D''$, $D'''$, are rollers at the rear end of the machine, between which the net or seine passes.

E and $E'$ are upright slotted supports or standards, constituting a part of the frame of the machine in the slots of which are suspended the tension rollers F, F, which rollers are supported and held up by the springs G, G, attached to the upper part of the standards E, $E'$.

H, H, are stationary friction rollers under which the twines from the bobbins $c$ are passed. These rollers are hung upon the shafts I, I, arranged in suitable bearings upon the frames of the machine.

J is a plate which runs across the machine from side to side. One end of this plate is partly curved around and rests upon the stationary shaft or bar K, the purpose of this curve being merely to avoid any sharp edge from coming against the twine as it passes over the end of this plate.

L is a cross bar running from side to side of the machine, and fixed to the frame thereof; upon this cross-bar the other end of the plate J rests.

M is another plate passing from side to side of the machine, and may be raised or lowered by the set screw $d$. This plate is rigidly secured at one end to the plate J and is free to move at the other. This plate M is provided with an opening throughout its length as shown in Fig. 3, the purposes of which will be explained hereinafter.

Sufficient has now been explained to enable us to follow the course of the twines leaving the bobbins $c$; these twines are marked with the letter $t$, and as will be seen, first pass down under the roller C, over the roller $C^x$, under the roller $C^{xx}$, over the tension rollers F, F, and under the friction rollers H, H, then over the end of the plate J, from thence over the plate M, and the cross-bar L, then under the friction roller O, under roller D, over roller $D'$, around under $D''$, and over and around $D'''$. The other twines are wound around the bobbins $C'$, leave the bobbins at the point marked X, pass around to the left over the bobbin-holders, and down under the friction roller O, and from thence follow the same course under, over, and between the friction rollers D, D', D'', D''', as the twines first described; these twines are marked in the drawings with the letter e.

I will now explain the construction of the bobbins C' and the bobbin-holders. These bobbins when in position in a working machine, are about eight inches in diameter, and about half an inch in thickness,—any size, however, will suit the purpose. By reference to Fig. 4, which shows a section of the bobbin the construction will be easily understood. 1, is one of the halves or sections of the bobbin, 2 is a central piece around which the twine is wound, and inclosed between the two halves of the bobbin, an outside view of which is given in Fig. 5; e is the twine. Fig. 6, shows an edge view of the bobbin as it appears when the twine is in place; this bobbin is placed inside of the ring marked 3, a view of which is given in Fig. 7. Through the side of this bobbin ring, perforations 4, 4, may be made to prevent any unnecessary unwinding of the twine, and at the top is a perforation through which the twine e passes from the bobbin to the friction roller O. This ring is also constructed with the raised piece 6, which is intended to spread and keep open the loop in the twine t, until it is passed over and under the bobbin. This bobbin and bobbin ring are suspended in the bobbin-holder, which I will now describe.

The journals 7, 7, have their bearings in a suitable part of the frame of the machine and are located in the rear of the semi-cylinders, as shown in the drawings. Upon these journals is supported the frame 8 to which frame are secured the bobbin-holders 9, by the screws 10, or by other suitable means. As will be seen the screws which secure the bobbin-holder to the frame, enter the bobbin-holder near one end, leaving the open space between the ends for the insertion of a bobbin, which is shown about to be placed in position in Fig. 8. The bobbin-holder is made of metal, and would form a ring if the circle were complete, but a portion of the circle is cut away, leaving the remainder slightly more than half a circle. The metal of which the bobbin-holder is made is thin enough to be slightly elastic, so as to allow the bobbin to be forced into place by a slight pressure, and when in place to be held there without danger of coming out until required to be removed, and at the same time to allow the loop thread to pass easily between the bobbin and its holder. When the bobbins are placed in the holders they occupy the position shown in perspective in Fig. 16, and in side view in Fig. 10; thus when the bobbins inclosed in their rings are inserted in the bobbin-holders, the spreader 6 occupies the space between the two ends of the bobbin-holder, which prevents the ring from turning and keeps the spreader in proper position for letting out the twine through the aperture X, and for opening and keeping open the loop as it passes over and under the bobbin.

Upon the frame 8 are brazed or otherwise secured, hooks, one for each twine or bobbin; these hooks are marked in the drawings 11; the purpose of each of these hooks is to catch, take up, and draw the loop of the twine t, forward, over, and around and under a bobbin until it engages and holds the twine e of such bobbin in position to be drawn into the knot which forms the mesh. These hooks may be placed upon the lower ends of the bobbin-holders as well as upon the supports on the frame, as shown in the drawings Figs. 8, 9, and 10.

The frame 8 carrying the bobbins and bobbin-holders and hooks being properly mounted on the journals 7, 7, the movement of the devices may be described as follows: Upon each journal 7, 7, is placed a cog-wheel 12 meshing into a corresponding segment 13, secured to the shaft 14. The shaft 14 may be made to turn or it may be secure, allowing the segments 13 to turn back and forth. An arm or lever 15, projects from the end of each segment, and is journaled to the connecting rod 16, the other end of which slides in the guiding bracket 17. This end of each connecting rod is forked so as to inclose within the fork a cam 18, on shaft B, and between the prongs of the fork is journaled the roller 19, which bears upon the circumferential edge of the cam 18; the forked end of this rod is also bent or elbowed around the shaft B, so as to escape this shaft while working. The springs 20 hold the rollers 19, tightly against the cam 18, so that the connecting rod responds readily to the movement imparted by the cam. The cam 18, it will be observed, is constructed in the same shape on opposite sides. I have marked the high points of this cam with the letters $f$ and $f'$: thus $f$, $f$, are equi-distant from the center of the shaft B, as are also $f'$, $f'$. While the cam 18 travels upon the roller 19 and from $g$ to $g'$, there is no movement of the rod 16. Suppose viewing Fig. 1 the shaft B to be turning to the left or in a direction opposite to the course of the hands of a clock; at the points $g$, $g$, a knot is finished, and the apparatus begins to form and make another.

I will now describe the operation of the bobbin-holder 9, and frame 8, beginning at the point when the part $g$ of the cam is in contact with the roller 19; and referring to the action in the case of one set of the operating devices, the segment 13, and arm 15, are now about the position shown in the drawings, Fig. 1, and remain in that position until the point $g'$ is reached, from $g'$ to $f$, the roller 19 is forced in the direction of the guiding bracket 17, carrying with it the connecting rod 16, and the arm 15, and turning the segment 13 in a direction opposite to that in which the cam 18 is turning; this movement of the segment 13, turns the spur-wheel 12, which carries with it the frame 8, carrying the bobbin-holders and hooks around until a hook passes down through the opening in the plate M, where it takes hold of the twine $t$; when the point $h$ of the cam is reached, the frame 8 has turned back to the point at which it started, carrying with it the twine $t$, formed into a loop; at this point the loop slips from the hook, and passes under the bobbin and between it and the bobbin holder, the position of the hook and loop as it slips being shown in Fig. 9. From the point $h$ to $f'$ the frame 8 and bobbin-holders 9 return toward the semi-cylinders $A'$, until the loop slips from between the bobbin and bobbin-holder, with the twine $e$ passing through the loop, as shown in Fig. 10, the cam then passes from the point $f'$ to the point $g$, while the tension rollers F, F, are drawing the knot tightly in place; at $g$, the cam begins again, going through the movements and performing the operations above described—thus it will be seen that the apparatus as shown in the drawings, goes twice through the operation of making a knot with one revolution of the shaft B.

As the parts above described are intimately connected with the devices which form the loop and prepare the twine $t$, for the knot, I will now describe that feature of the invention.

$A'$, $A'$, are cylinders cut partly in half lengthwise or in the direction of the axis as shown in Fig. 11, thus forming a semi-cylinder for a portion of the length of each. The lower parts of these cylinders are reduced in diameter as shown at $i$, so as to form a groove around this end of each half cylinder; secured to the upper part of each of these cylinders is the rod $B'$, the upper part of which is threaded as shown at $B^6$, and attached to the top of the rods $B'$ are cog-wheels $B^2$ secured thereto so as to turn the rods when the wheels are turned by the rack $B^3$. Attached to a suitable part of the frame of the machine are cross-bars $B^4$ and $B^5$, the upper one of which is threaded so as to receive the threaded portion of the rods $B'$, and the lower one of which is formed with plain perforations, its purpose being that of a guide and steadying device for the rods $B'$, which pass through it. The rack $B^3$ is given a movement as will be hereinafter described, which turns the cog-wheels and rods $B'$, and also the cylinders through one and a quarter revolutions more or less, and back again to the position at which they started. Fig. 3, shows the position at which they start. Turning in a direction opposite to the course of the hands of a watch, each twine is caught by the recess $i$, Fig. 15, on the end of the cylinder, and turned one revolution and about one quarter of a revolution, thereby winding a loop of the twine about the point $A^2$. By the time one revolution is made the cylinders are lifted by the action of the screw $B^6$, so that in making the additional portion of the revolution, the ends of the cylinders escape the twine $t$, above which they turn. Fig. 18, shows the position of one of the cylinders when thus turned as well as the form and position of the twine $t$, with relation to the hook.

I will now describe the mechanism by which the cylinders are turned to catch and fold the twine. Fig. 13 shows a top of the cog-wheels $B^2$ and the rack $B^3$. Fig. 17 is an elevation of the same. In any suitable part of the frame, I mount the shaft 21, which is at each end provided with the cylinder provided with a cam groove, such as shown in Fig. 12, and the shaft 21 receives its motion from the main shaft B by means of a belt 30, as shown in the drawings. In the groove upon each cylinder is inserted the end of the lever 23, pivoted suitably at 24, the upper end of the lever 23, being forked so as to inclose a pin 25 attached to the rack $B^3$. The distance between the points of the arrow heads in Fig. 17 is the amount of travel given by the cam to that end of the rod, such motion being sufficient to give about one and a quarter turns to the wheels $B^2$ and the cylinders $A'$. A motion thus imparted it will be readily seen may be regulated to turn the wheels and cylinders at the proper time and throw the rack backward or forward by adjusting the cylinders provided with the cam grooves upon the shaft 21 and when adjusted fixing them firmly to the shaft. The cam by which the forked lever 23 attached to the rack is moved may be constructed as shown so as to give the rack both its backward and forward movement, or a cam and forked lever constructed to impart movement in but one direction may be used at each side of the machine, one set of devices serving to move the rack in one direction while the other moves it in the opposite direction. The form shown in the drawings consists of a duplication of the cam giving motion in both directions; two cams of this kind and two levers are shown. When the hook 11 has caught the twine, the frame 8 carrying the hook is turned back by the movement of the devices before described, the loop passing around and under the bobbin, as shown in Fig. 9; the bobbin-holder is then turned in the direction of the cylinders again until the loop slips out, catching the twine $e$, as shown in Fig. 10; the loop is then pushed from the cylinder by a device shown in Fig. 15. This device may be arranged so that the loop may leave the cylinder slightly before the loop is released from the hook; it may be thus described:

To the plate $A^7$, I attach an arm $D^2$, which supports the upright $D^3$. From the top of this upright a bar $D^4$ projects having attached to it the segment $D^5$, which surrounds or partly surrounds the cylinder $A'$, and is so arranged that it may move up and down with the movement of the rod $A^6$. These devices are clearly shown in Fig. 15, and are omitted from Fig. 1, for the sake of securing greater clearness.

To the segment $D^5$, I attach a small rod, or several of them if desired, marked in the drawings $D^6$. The lower end of this rod is arranged in contact with the looped twine around the end of the cylinder and may be longer or shorter to act more or less quickly upon the loop. It will be seen by this that when the rod $A^6$, is pulled down, the rod $D^6$ will strike the twine wound upon the end of the cylinder and throw it off. At this time the pin $A^2$ is pulled down, releasing the folds of twine wound around the pin when the tension rollers F, F, pull the knot tight.

The mechanism by which the pin $A^2$ is pulled down to release the folds of the twine I will now describe: Upon the shaft B, located nearly under the pin $A^2$, I have placed a cam $A^3$, the circumferential face of which runs upon the lever $A^4$, which lever is pivoted at $A^5$. To the arm of this lever I connect the rod $A^6$, which continues up through the frame of the machine, and is secured to and operates the plate or bar $A^7$ to which the pins are attached, or the pins may be otherwise attached to the end of it.

$A^7$ is a plate securely attached to the rod, and between this plate and a suitable part of the frame of the machine marked $A^8$, I have placed the spring $A^9$, which holds the pin $A^2$ in position until pulled down by the action of the cam $A^3$ upon the lever $A^4$. When the pin is thus pulled down and the loop released to be drawn taut by the tension rollers, the twines are moved forward at the same moment a sufficient distance for the next knot, which distance is gaged to suit the size of the mesh. This is accomplished by the following mechanism.

$c^3$ is a bar running lengthwise of the machine. This bar is supported at each end from the shafts $c^4$, $c^5$, $C^6$, $C^7$, by the arms $c^7$, $c^8$, $c^9$, $c^{10}$.

$c^{10}$ is a standard supporting the shaft $c^{11}$, which is journaled therein and carries the slotted arm $c^{12}$ connected by rod $c^{18}$ to the bar $c^3$. Upon the shaft B, I have attached the segmental cog-wheel $c^{13}$, which meshes into the segmental cog-wheel $c^{14}$, secured to the shaft $c^{11}$. The cogged segments are so arranged upon the wheel and shaft as to begin the movement which throws forward the bar $c^3$, just before the pin $A^2$ is pulled down to release the twine. This is done to prevent the knot from being pulled back by the tension rollers behind the pin and to avoid any danger of tangling the twine and pin together; thus the movement forward of the bar $c^3$ works the pawls and ratchets $c^{15}$, $c^{16}$, turning the friction rollers D and D'', and pulling the twine out and forward a sufficient distance to form the next knot in proper place; when it is desired to make the meshes larger or smaller, the pin $c^{17}$ is slid up or down in the slot in the arm $c^{12}$. The rod $c^{18}$ may also be arranged at its other end to slide in a slot formed in the bar $c^3$, as shown, if desired. The movement of the bar $c^3$ forward also turns the rollers C, $C^{\times\times}$ by means of the pawls attached to the arms $c^7$ and $c^{10}$, and their corresponding ratchets, but as it is necessary to let out a little more twine at this end of the machine to allow for the amount of twine consumed by the formation of the knot, I have provided slots in the arms $c^7$, $c^{10}$, which rock on the journals at the ends of the rollers C $C^{\times\times}$ and connect said arms with the bar $c^3$ by pins which are free to move up and down in the said slots. The slots in the levers $c^7$ and $c^{10}$ are provided for the purpose of permitting a little extra twine to be drawn from the spools for the formation of the knot which is recovered by the weight of the rollers C and $C^{\times\times}$. The rollers C, $C^{\times}$ and $C^{\times\times}$ are journaled in the frame of the machine in the bottom of slots shown in dotted lines for $C^{\times}$. It will thus be seen that when a tension is applied to the twines by the knot forming mechanism to draw out an additional quantity of twine, the rollers C, $C^{\times}$ and $C^{\times\times}$ will be raised, and the requisite quantity of twine given off to form the knots. As soon as the knot is formed the weight of these rollers resting upon the twine will draw it back again and take up the slack.

$c^{19}$ is a spring attached to the bar $c^{10}$, and to any suitable part of the frame of the machine to draw the bar back when released.

The knots are all tied as above described, but when the machine is ready to tie the second knot, the bobbin-holders and hooks are moved sidewise just one twine, so that the twine forming the loop which has passed over the first bobbin and caught the twine $e$, does not pass over the same bobbin the next time, but the one adjacent thereto, thus it is that the bobbin thread $e$ by being tied first to one twine and then to the next one and then back again to the first and so on alternately, gives form to the meshes of the net or seine. Fig. 14, will illustrate this, in which figure the letters $e$ indicate the bobbin twine and $t$ the spool twine. The movement of these bobbins and hooks backward and forward, is effected by a very simple mechanism. Upon the face of each cam 22 on the shaft 21, I have erected another cam 26, the elevations and depressions of the two cams 26 being reversed in position. The lever 27, at one end of the machine is pivoted at 28, and forked at 29, so as to work in an annular groove around the end of the journal 7, of frame 8, and throws that frame with its bobbin-holders, bobbins and hooks in one direction, while the cam on the other end of the shaft 21, with a similarly arranged intermediate lever throws it in the other direction.

The machine operates in the following order: The twines $t$ are first placed in position in the machine, as heretofore described; the bobbins C' are wound with the twines $e$ the ends of which are brought out and passed under the roller O and around through the friction rollers; the machine is then started with the point $g$ of the cam 18 in contact with the roller 19; the cylinders A' turn as before described, through one and one quarter revolutions, more or less, forming the loops as shown in Fig. 18; the hooks 11, then take up the twines $t$ and bring the loops back around and over the bobbins letting it slip between the bobbins and the bobbin-holders, as shown in Fig. 9; the bobbin-holders are then turned back until the loops slip out catching the twines $e$ as shown in Fig. 10; the cam $A^3$ now pulls down the pins releasing the folds of twine, the bar $C^3$ operates the rollers D, D′, &c. to move the twine forward while the cylinders are returning to their original position as shown in Fig. 3; the bobbin holding frame is then pushed over carrying the bobbins and hooks to the next twine and the cam 18 is turned until the point $g$ on the other side of the cam comes in contact with the roller 19, when another set of knots is begun and tied in the same way.

It will be seen that I have described generally one form of apparatus or machine which will do the work. It may, however, be varied and modified in many ways. For example, the plate J may be dispensed with, the plate M being sufficient without it; the number of tension and friction rollers may be increased or diminished as circumstances require, and the cams may be placed on supplemental shafts. These modifications however, are mechanical and form no special part of the invention.

Having now described the apparatus and its mode of operation, what I claim as new and desire to secure by Letters Patent, is:

1. The combination of the bobbin C′ with a ring provided with the spreader 6, as described.

2. The frame 8, in combination with the bobbin-holders 9, rigidly secured to the frame, and the bobbins C′ inserted in the bobbin-holders, substantially as shown.

3. The bobbin-holder 9, constructed in the form of an incomplete ring, in combination with the bobbin C′, seated in the bobbin-holder and provided with the spreader 6, occupying the space between the ends of the bobbin-holder ring, as described and shown.

4. The combination of the frame 8, bobbin-holders 9, secured to the frame, bobbins C′ seated within the bobbin-holders and hooks 11, as set forth.

5. The combination of the frame 8, and bobbin holders 9 rigidly secured thereto provided with journals as set forth, the supporting frame-work therefor, and mechanism for rotating the frame, as shown and described.

6. The combination of the frame 8 provided with journals as set forth, the supporting frame-work therefor, the bobbin-holders 9, and bobbins C′ seated within the holders, the hooks 11, and means for sliding the frame laterally, whereby the frame and its attachments are carried from one twine to the next adjoining one, substantially as shown.

7. The combination of the frame 8 provided with journals as set forth, the supporting frame-work therefor, bobbin-holders 9, bobbins C′, hooks 11, and means for rotating the frame and sliding it laterally, as set forth.

8. The combination of the frame 8, provided with journals as set forth, the supporting frame-work therefor, the bobbin-holders 9, bobbins C′, and hooks 11, and means for giving the following rotary movements to the frame, first forward to enable the hooks to catch the twine, then backward to draw the loop over the bobbin, then forward to release the loop, substantially as shown.

9. A loop forming device, constructed in the form of a semi-cylinder and provided with a circumferential notch or groove at its lower end, substantially as described.

10. A loop forming device constructed in the form of a semi-cylinder, in combination with the pin $A^2$, and means for rotating the semi-cylinder around the pin, as set forth.

11. A loop forming device substantially as shown, in combination with the pin $A^2$, and means for rotating the loop-forming device one and a quarter turns around the pin and back again to its original position.

12. The combination of the loop-forming device substantially as shown, with the pin $A^2$, mechanism for rotating the loop forming device, and means for raising it as it turns to escape the twine, substantially as shown.

13. The combination of the semi-cylinders A′, rods B′, provided with screws $B^6$, cross-bar $B^4$, cog-wheels $B^2$, rack $B^3$, lever 23, and cylinder provided with cam groove 22, and mechanism for actuating said cylinder, substantially as shown.

14. The combination of the semi-cylinder A′, and bar $B^6$, and means for imparting a rotary and vertical motion to the semi-cylinder A′, substantially as shown.

15. The combination of the semi-cylinders A′, and means for actuating the same, the pins $A^2$, means for pushing the loops from the semi-cylinders, and means for drawing down the pins, substantially as shown.

16. The combination of the semi-cylinders A′, means for actuating the same, pins $A^2$, bobbin-holders 9, bobbins C′ and hooks 11, the frame 8, and means for actuating said frame, substantially as shown.

17. The combination of the plate M, plate J, thumb screw $d$, arranged and operating substantially as described.

18. The combination of the plate M, with means for tilting the plate to adapt it to the proper angle, and the hooks 11, and means for actuating said hooks, as set forth.

19. The combination of the plate $A^7$, projection $D^2$, standard $D^3$, arm $D^4$, ring $D^5$, and rod $D^6$, means whereby said rod is moved up and down, as set forth.

Signed at Baltimore city and State of Maryland this 15th day of December, A. D. 1891.

GEORGE W. PRICE.

Witnesses:
H. MacCARTHY,
C. R. GALLAGHER.